United States Patent
Donzis et al.

(10) Patent No.: US 9,727,658 B2
(45) Date of Patent: *Aug. 8, 2017

(54) METHOD AND APPARATUS OF PROCESSING INVALID USER INPUT SEARCH INFORMATION

(71) Applicant: PERFTECH, INC., San Antonio, TX (US)

(72) Inventors: Lewis Thomas Donzis, San Antonio, TX (US); John Anthony Murphy, San Antonio, TX (US); Johathan Elliott Schmidt, San Antonio, TX (US); Henry Michael Donzis, San Antonio, TX (US); Peter Wayne Baron, San Antonio, TX (US); Lee Carl Ziegenhals, Boerne, TX (US)

(73) Assignee: PERFTECH, INC., San Antonio, TX (US)

( * ) Notice: Subject to any disclaimer, the term of this patent is extended or adjusted under 35 U.S.C. 154(b) by 543 days.

This patent is subject to a terminal disclaimer.

(21) Appl. No.: 14/456,126

(22) Filed: Aug. 11, 2014

(65) Prior Publication Data

US 2014/0351690 A1 Nov. 27, 2014

Related U.S. Application Data

(63) Continuation of application No. 13/217,076, filed on Aug. 24, 2011, now Pat. No. 8,806,004.

(51) Int. Cl.
*G06F 15/16* (2006.01)
*G06F 17/30* (2006.01)
*H04L 29/06* (2006.01)
*H04L 29/08* (2006.01)
*H04L 29/12* (2006.01)

(52) U.S. Cl.
CPC .. *G06F 17/30887* (2013.01); *G06F 17/30864* (2013.01); *H04L 63/1441* (2013.01); *H04L 67/02* (2013.01); *H04L 67/2814* (2013.01); *H04L 61/1511* (2013.01)

(58) Field of Classification Search
CPC .................. G06F 17/30887; H04L 63/1441
USPC .................. 709/203, 224, 227–229
See application file for complete search history.

(56) References Cited

U.S. PATENT DOCUMENTS

| | | | |
|---|---|---|---|
| 8,806,004 B2* | 8/2014 | Donzis | G06F 17/30887 709/224 |
| 2004/0125149 A1* | 7/2004 | Lapidous | G06F 3/0481 715/808 |
| 2008/0301139 A1* | 12/2008 | Wang | G06F 17/30887 |

OTHER PUBLICATIONS

Agarwal, A. "Stop OpenDNS from Redirecting Invalid URLs to their Search Pages", Aug. 4, 2008, from labnol.org.*

(Continued)

*Primary Examiner* — David Lazaro (57) ABSTRACT

A method and apparatus of processing a user initiated request for information is disclosed. The method may provide receiving a user initiated request including a uniform resource locator (URL) submitted to a web browser application and receiving a response that the URL is an invalid URL that cannot be resolved to a corresponding webpage. The method may also include blocking a subsequent attempt to transmit the user initiated request as a browser modified search request that includes modifications to the user initiated request.

20 Claims, 4 Drawing Sheets

(56) References Cited

OTHER PUBLICATIONS

Shue et al. "Exploitable Redirects on the Web: Identification, Prevalence and Defense" from WOOT 2008.*
"DNS knowledge" Aug. 17, 2009, by dnsknowledge.com.*

* cited by examiner

METHOD AND APPARATUS OF PROCESSING INVALID USER INPUT SEARCH INFORMATION

CROSS REFERENCE TO RELATED APPLICATIONS

The present invention is a continuation and claims the benefit and priority of patent application Ser. No. 13/217,076, titled METHOD AND APPARATUS OF PROCESSING INVALID USER INPUT SEARCH INFORMATION, filed on Aug. 24, 2011, issued on Aug. 12, 2014, U.S. Pat. No. 8,806,004, the entire contents of which are incorporated by reference herein.

TECHNICAL FIELD OF THE INVENTION

This invention relates to a method and apparatus of processing user input information, such as website addresses, and, more particularly, to interpreting and resolving the errors generated by invalid web address and web search entries submitted to a web browser application's address bar.

BACKGROUND OF THE INVENTION

Consumers seeking access to information often rely on the Internet as a quick and easy source of information. In recent years, the speed and accuracy of a web search or web address submission to a web browser has become increasingly simple for the end user to execute. In fact, web browsers and corresponding web search engines often have backend tools and applications that correct user input search information seamlessly with or without the user's approval.

The corrective actions performed by the browser application and/or the search engine may provide an easy alternative to requiring the user to re-enter a web address or any portion of a search string set of terms or phrases. However, the corrective measures taken by the web browser, the search engine and/or the Internet service provider (ISP) are often biased and do not always provide the end user with the most relevant information pertaining to the user's requested search criteria. For example, the user may be searching for a particular subject and may enter the subjective content as a word or phrase into a search engine, or may enter the content into the web address portion of the web browser without knowing an exact web address corresponding to the desired content. As a result, the search criteria may be return an invalid result since it did not positively identify a known web address.

The invalid entry of website information or related web search information in the browser's address bar may pose an opportunity for the ISP, the search engine and/or the browser to transfer the request to a landing page or sponsored website link page, which may or may not be related to the search criteria entered by the user. The reason for invoking the redirect of the search criteria is a monetary opportunity for the ISP, the browser company and/or the search engine to capitalize on the user's inability to locate the correct destination website. The emerging business of redirecting website requests to sponsored landing pages is a multi-million dollar business that generates profits from redirecting the user's searches or invalid website entries to web pages that are often undesirable to the user and/or unrelated to the user's search criteria.

SUMMARY OF THE INVENTION

One embodiment of the present invention may include a method of processing a user initiated request for information. The method may include receiving a user initiated request including a uniform resource locator (URL) submitted to a web browser application. The method may also include receiving a response that the URL is an invalid URL that cannot be resolved to a corresponding webpage, and blocking a subsequent attempt to transmit the user initiated request as a browser modified search request that includes modifications to the user initiated request.

Another example embodiment of the present invention may include an apparatus configured to process a user initiated request for information. The apparatus may include a receiver configured to receive a user initiated request including a uniform resource locator (URL) submitted to a web browser application and receive a response that the URL is an invalid URL that cannot be resolved to a corresponding webpage. The apparatus may also include a processor configured to block a subsequent attempt to transmit the user initiated request as a browser modified search request that includes modifications to the user initiated request.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Certain vendors' products are intended to capture a web browser's connection to the Internet when the browser attempts to browse for what appears to be a well-formatted webpage and corresponding uniform resource locator (URL). However, the result of an invalid web address submitted as a website retrieval request may obtain a "NXDOMAIN" type HTTP response from the domain name server (DNS). This type of response may, in turn, yield a visual error result for the user (i.e., ERROR—the domain does not exist).

A number of consumer Internet service providers (ISPs) such as Cablevision's Optimum Online, Comcast, Time Warner, Cox Communications, RCN, Rogers, Charter Communications, Verizon, Virgin Media, Frontier Communications, Bell Sympatico, UPC, T-Online, Optus, Mediacom, ONO_(Spain), and Bigpond (Telstra) may implement domain name server (DNS) hijacking for their own purposes, such as displaying advertisements or collecting statistics. This practice may violate the RFC standard for DNS (NXDOMAIN) responses, and can potentially open users to cross-site scripting attacks.

Redirecting website or Internet search requests can be less intrusive allowing a DNS server, provided by a service, such as OpenDNS to intercept and block known sites known to be malicious or known to have content which the user wishes to block, etc. The provider of the DNS server may charge a fee for this service, or also promote advertisements, collect statistics, etc. DNS hijacking is commonly implemented around hijacking a NXDOMAIN response. Internet and intranet applications rely on the NXDOMAIN response to describe the condition where the DNS has no entry (match) for the specified host. A NXDOMAIN response informs the application that the name is invalid and usually informs the user that an error has occurred. However, if the domain name is queried on non-compliant ISPs, the end user would always receive a fake IP address belonging to the ISP.

When browsing within a web browser, this forceful redirecting of the users inquiry can be annoying or offensive as connections to this IP address display the ISP redirect page of the provider, sometimes with advertising, instead of a proper error message. However, other applications that rely on the NXDOMAIN error will instead attempt to initiate connections to this spoofed IP address, potentially exposing sensitive information. It is the nature of the implementation of TCP/IP to issue a DNS request that is independent of any information that could be used to determine the activity or program in the device that issued the request. Consequently, many other connection-oriented activities, such as virtual private network (VPNs), are disrupted and often rendered broken by these types of communications.

One example method of operation may include detecting a browser-automatic-redirection of a user initiated search attempt from the browser's address bar. When the search is input into the browser address bar directly, the URL must be in a standard format or else an error is almost inevitably received. These browser-automatic-redirection of a user initiated search attempts are generally not from regular searches entered into the search engine pages, such as provided on the home page of Google, Bing, or Yahoo.

Another example embodiment may include only observe the upstream HTTP traffic, detect the occurrence of the above-noted activity, and cause the user's browser to be redirected to an ISP-designated landing page with the original search term accompanying the redirection to provide relevant search results along with other information.

Figure 1:
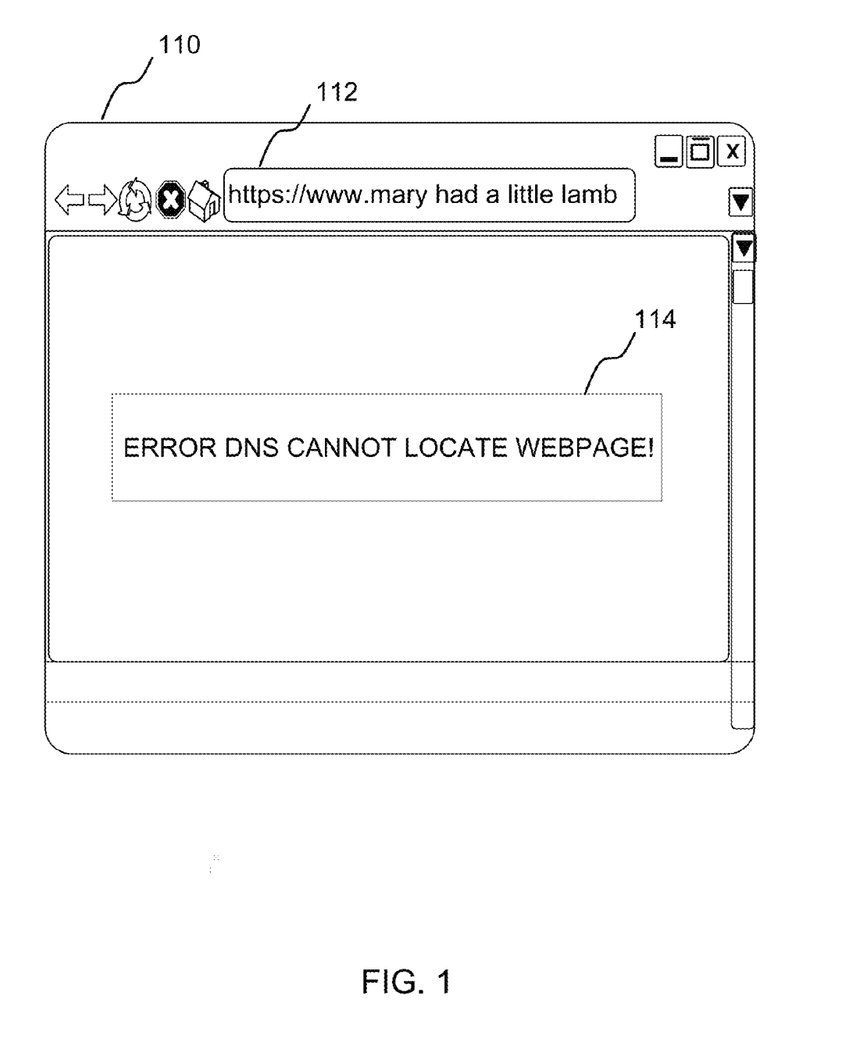
FIG. 1 illustrates an example user initiated web page search according to example embodiments of the present invention

FIG. 1 illustrates an example web browser according to example embodiments. Referring to FIG. 1, the address bar 112 of a web browser 110 is being used to initiate a search for a user inputted message of "Mary Had a Little Lamb." Clearly, such a long phrase is not likely to be recognized by the search engine or corresponding DNS server as a pre-stored web address. Some web browsers will recognize this input as a false URL, and will respond with an error message 114 indicating that the DNS server has found the web address to be invalid. Other web browsers operating in default configuration (e.g., Internet Explorer®) will take the input "Mary had a little Lamb" and submit it to a search engine, such as BINGO or Google®. The result may be a page of suggestions and related advertisements, which are motivated by a pre-existing business agreement. If the user observes and clicks on any of the sponsored links related to the landing page, one or more entities will profit from the user's selection of the sponsored link.

Some vendors have a filter enabled before the DNS server that resolves the inputted web address information. In this case, the generated "NXDOMAIN" message will be discovered in the overhead search data and the user's query will be automatically redirected to a bogus URL that goes to a monetizing landing page. Landing pages are usually almost entirely unrelated to the search criteria and may produce bogus results which the end user will find unsatisfactory as a response to an attempt to find a relevant website.

Example embodiments of the present invention include examining a URL that has been modified by a browser to be forwarded to a specific search engine and/or in response to encountering an anomaly responsive to obtaining the IP address of the URL domain. In general, the modified URL may be filtered since it has certain characteristics that are recognizable.

According to one example, if search engine specific searches are captured at the ISP and sent to a bogus landing page, customers may complain and the search engine companies may also complain. Examples of certain web browsers may include, Internet Explorer versions (i.e., IE6, IE7, IE8), Firefox versions, Chrome versions, different default engines, etc. Browser modified searches, are performed automatically under certain error conditions. These modified searches are the types of searches that take the user input information, intercept the NXDOMAIN error message and modify the original error information to redirect the search to comply with the corresponding search engine instead of returning an error message. In each of these browser modified search examples, there are no REFERER HTTP parameters in the overhead data of the search information. The browsers do not have a procedure for discovering when a user initiated input string entered into the address bar is not a well-formed domain, and as a result the browser does not attempt to resolve the invalid DNS address. In this example, a NXDOMAIN HTTP response message will not be presented before submitting the string in the address bar to a default landing page, which can also be utilized by a search engine to produce some customized landing page search results and monetized advertising.

When visiting a webpage, the referrer or referring page may be the URL of the previous webpage from which a link was followed. A referrer is the URL of a previous item which led to a subsequent webpage or search request. The referrer for an image, for example, is generally the HTML page on which it is to be displayed. The referrer field (intentionally misspelled as REFERER) is an optional part of the HTTP request sent by the web browser to the web server.

A REFERER refers to the webpage that initiated the search and the word, REFERER, is submitted to the search engine as part of the normally hidden header block of a user initiated search, which includes the user agent fingerprint we used. However, a browser modified search of a non-recognizable URL does not include a REFER parameter when the browser modifies an automated search. The browser modified search modifies the original user input search or query for a particular URL. In general, any user initiated search or webpage request that is initially submitted to a web browser will almost always generate a REFER parameter when the domain name of the URL cannot be resolved.

According to example embodiments, a filter is configured to filter the website request data. The filter may be a packet filter that is used to examine received packet information for certain HTTP request information. The information in the website request data is examined for the existence of a REFERER message. If the REFERER message is present, then that particular request is left alone. This ensures that the search engines and ISPs are not violating the RFC committee rules or creating problems for the Internet search engines. However, if the message is a web browser modified search that does not include the REFERER parameter then that particular query is blocked so that the efforts of the browser to redirect the invalid search results to a landing page or other third party information source is stopped. In other words, the search filtering application according to example embodiments will allow the passing of the questionable URLs or initially invalid URLs entered by the user (e.g., those that could have been intentionally entered to search for something specific). Those search initiated URLs that are allowed to pass from the ISP to the Internet and subsequent search engines, etc., include the REFERER parameter as part of the HTTP request (e.g., in the header).

Implementing a check for a REFERER parameter in a browser request header provides one example way to distinguish original user initiated queries from browser modified queries. Two common instances when an Internet user with a web browser performs a search for a term may be when typing the search into a Google, Yahoo or Bing search box or home page, or into a separate search box on some other search-enabled webpage that is provided for the convenience of the visitor to perform a search directly from that webpage (e.g., a small search box on an otherwise established webpage CNN, MSN, etc.).

Figure 2:
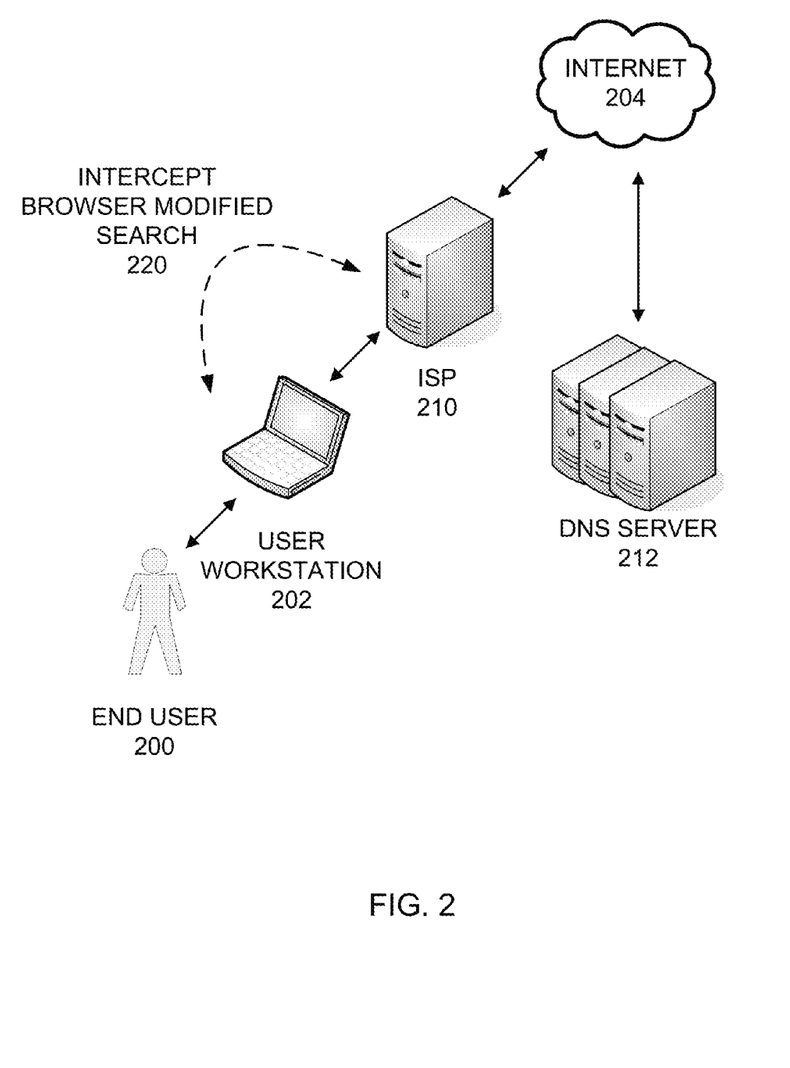
FIG. 2 illustrates an example network configuration according to example embodiments of the present invention.

FIG. 2 illustrates an Internet search network configuration according to example embodiments. Referring to FIG. 2, the end user 200 may type a search into the address bar of the web browser 110 (as illustrated in FIG. 1), which is where a URL inquiry normally is placed. The search is sent from the user's personal computer/workstation 202, or may instead be sent from a comparable mobile computing device, such as a tablet computing device, smartphone, PDA, etc. If the domain name URL does not exist according to the local DNS server 212, then an NXDOMAIN HTTP response may be received at the ISP 210 over the Internet and forwarded to the end user 200. The NXDOMAIN HTTP response may be a response from the DNS server 212 that it cannot resolve the request. When this response is received, the ISP 210 resubmits (redirects) the request to the default-configured search provider, which may be configured in the web browser. For example, for current versions of Internet Explorer the default search provider is BING, and for Firefox, it's Google. The web browser may recognize invalid or impossible domain names and may proceed to skip the lookup procedure and instead send the request directly to BING or a user-selected default provider.

Most ISPs now use products that sit in front of the DNS server and capture the DNS responses, and when they respond with an NXDOMAIN, those products instead return the IP address of a search landing page with advertisements that are sponsored by third party affiliates. This scenario provides ISPs with about a buck per year for each subscriber as added revenue. However, all such ISPs are required to accommodate users for with the replacement of the NXDOMAIN message by redirecting them to a fake landing page address which causes disruption. Such a default redirection of the users' search requests are generally regarded as unsatisfactory to the users.

Fewer user mistakes are reported back to the user as more browsers response responds with predetermined links from an invalid webpage, the browser history and/or the favorites bar, etc. Users are increasingly implementing the address bar as a tool from which to initiate a search. The newer search related applications are redirecting all invalid web address requests to a search provider, which directs them to a facility that examines the search request and tries to determine if it came from an automatically generated search related to the address bar of the web browser. Alternatively, the search may have been originated from a search engine home page, (Google). If the search is examined and the data reveals that it is an automatic search from the address bar, the user may be redirected to the ISP's monetizing landing page.

According to example embodiments, the URL request is examined closely via a filter to examine the URL request directly without redirecting the user's request to a third party landing page and without having to look at the DNS traffic. The patterns for requests automatically generated by the web browser usually appear differently from those that come from other intentional search boxes or home pages.

According to one example, the terms CHEAP and PATENT were entered as two separated words into an address bar of a web browser. The search engine recognized that the URL was not formatted correctly and was not a well-formed URL. As a result, the search was automatically sent to a search engine that was configured as the default-configured search provider.

The dialog from the web browser was analyzed by a protocol analyzer, and the result is included below.

```
GET/
search?source=ig&hl=en&rlz=&q=cheap+patent&btnG=Google+Search&aq=f&aqi=g-v1g-b1&aql=&oq= HTTP/1.1
    Host: www.google.com
    User-Agent: Mozilla/5.0 (Windows NT 6.1; WOW64; rv:2.0.1)
    Gecko/20100101 Firefox/4.0.1
    Accept:
text/html,application/xhtml+xml,application/xml;q=0.9,*/;q=0.8
    Accept-Language: en-us,en;q=0.5
```

```
Accept-Encoding: gzip, deflate
Accept-Charset: ISO-8859-1,utf-8;q=0.7,*;q=0.7
Keep-Alive: 115
Connection: keep-alive
Referer: http://www.google.com/ig?hl=en
Cookie:
PREF=ID=162ec2c30fca3a3d:U=415e2783207dd2be:TM=1308507183:L
M=1308507183:S=7PJ9YHYENVdLxphJ;
NID=48=ILnd9NzontdZdikvop08LIjb26Kh3Xski60vfQIAMonJOChYyvxj
bgTm7ZMOI3NCUv953lRjlCnFXrpUdTkRlMAlX2u1T2duafB6Uk3RnYuWqZ2
BVnB-eW3gLHQVhaqH;     SID=DQAAALoAAAB9LcIuT--sMdWjkoggdHkze-
6wwO13pWkZ7qyowyVraiEKXGM37baZeHsenv05RWgoQTLQWoDLm4pGAwDjR
nVNCEGvo5XeKH14yC4vgS8rdDXtVIq4ag20eRlWB9CF0BxLQUaRW4QyUHvX
HHW6mkdGYjZB3-aLmJzkhnBgOzPgyCx52DyXkKS2-
YavomA0gCSjWG5gqS1izB3HuK-pxjBWo1jqFjzKGQuE_2px-
ZgOmoC8782mEfpnybrkrwWLbEo; HSID=AAMxYgzQTmoflsnK7.
```

The first line is the GET (after the first forward slash) with the various data included with CHEAP and PATENT in the GET and the host will send it to the second line of a search engine. Identifying the unique address bar-generated pattern of information and the ability to extract the search words (in this example right after "&q=") that makes this search intercepting application operate correctly.

Below is an example of an Internet Explorer address bar entry that would be sent to Google, but identified by this application. As may be observed about ⅔ of the way down captured data, a reference to "Referer: http://www.google-.com/ig?hl=en" indicates that the webpage that was used to enter the search for CHEAP and PATENT. In this example, the search engine was Google's homepage. Given the data provided above, this could not have been an address bar search query since REFERER was part of the dialog.

If the search request initiates directly from the browser's address bar, the web browsers do not send a REFERER. In this example, certain liberties may be taken since the REFERER parameter is not present. Since it is known that any of the home page searches or any of the GOGGLE search boxes included on third party webpages, for example, always have REFERER in the dialog. An automatic search from the address bar does not include any REFERER parameter. Capturing more address bar searches which have been modified by the web browser and do not have a REFERER parameter can limit the amount of landing page redirects and other browser modified activity that end user may find unsatisfactory.

If the REFERER parameter is not present in the intercepted/filtered search initiated data and it matches a predetermined pattern stored in the application itself for the more common web browsers (e.g., IE6, IE7, IE8, IE9, XP, Vista, WIN7, Firefox versions, Chrome versions, etc.)

Some web browser versions, for example, do not discriminate between the in-browser search box and the browser search address bar. In those browser versions, it may be desired to avoid a redirection since the user is intentionally using a specially marked search box provided by the website. As a result, the issued HTTP request can be examined by trial and error to determine which browser-initiated automatic searches performed from the address bar are distinct in address bar only user initiated searches.

The operations of a method or algorithm described in connection with the embodiments disclosed herein may be embodied directly in hardware, in a computer program executed by a processor, or in a combination of the two. A computer program may be embodied on a computer readable medium, such as, a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 3 illustrates an example network element 300, which may represent any of the above-described network components of FIG. 2.

Figure 3:
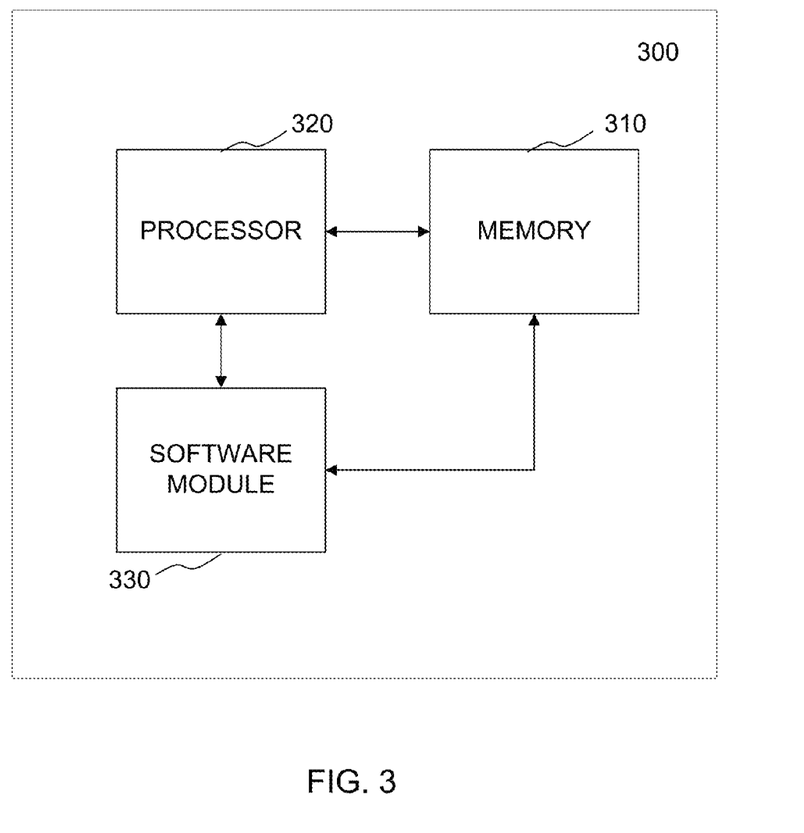
FIG. 3 illustrates a network entity that may include memory, software code and other computer processing hardware, and which may be configured to perform operations according to example embodiments of the present invention.

As illustrated in FIG. 3, a memory 310 and a processor 320 may be discrete components of the network entity 300 that are used to execute an application or set of operations. The application may be coded in software in a computer language understood by the processor 320, and stored in a non-transitory computer readable medium, such as, the memory 310. Furthermore, a software module 330 may be another discrete entity that is part of the network entity 300, and which contains software instructions that may be executed by the processor 320. In addition to the above noted components of the network entity 300, the network entity 300 may also have a transmitter and receiver pair configured to receive and transmit communication signals (not shown).

One example method of processing a user initiated request for information may include examining a web browser's response data generated in response to a user initiated request including a uniform resource locator (URL) submitted by the user to the web browser application. In response, it may be determined by examination from the browser response data that the URL is an invalid URL that cannot be resolved to a corresponding webpage. In response, subsequent attempt to transmit the user initiated request as a browser modified search request that includes modifications to the user initiated request may be blocked.

Some browsers operate by receiving the "NXDOMAIN" message and taking no action at all. Other browsers, such as IE and Chrome, respond when receiving a NXDOMAIN data parameter because the domain could not be resolved in the DNS. Generally, the additional operations performed by the browser are performed since the input information appeared to be a properly formatted web domain or URL. For example, by continuing to submit the unresolved (NX-DOMAIN) URL to the search engine, the example embodiments of the present application will be readily invoked.

Figure 4:
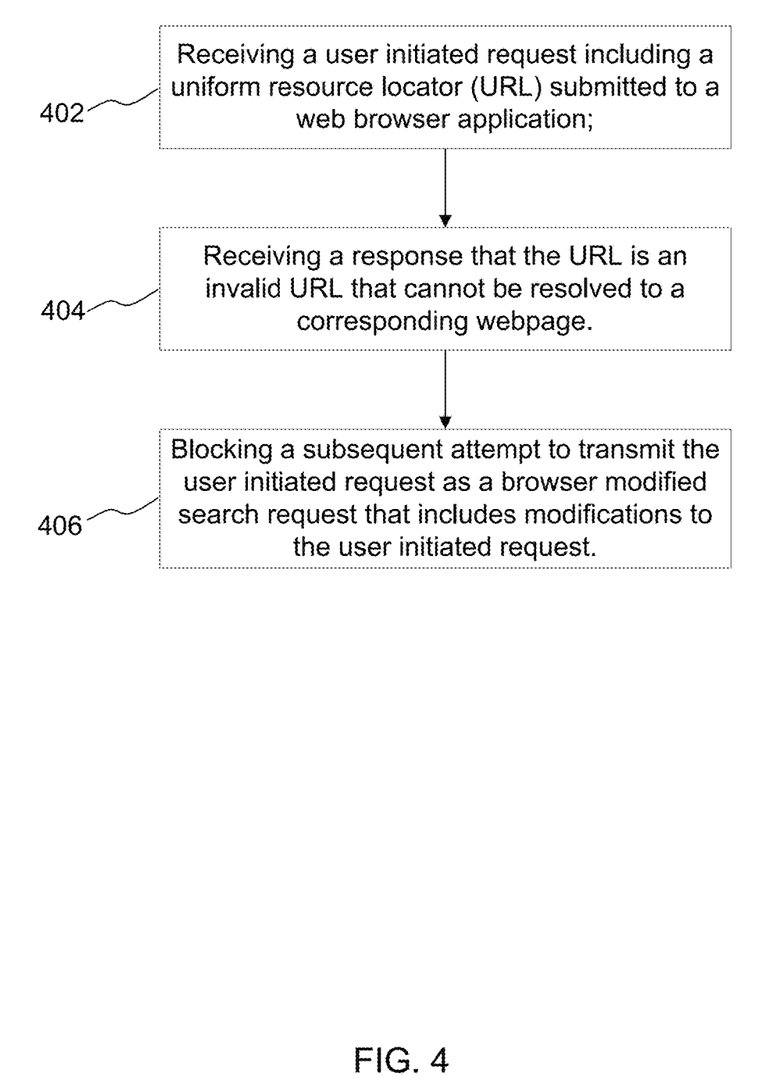
FIG. 4 illustrates a flow diagram of an example method of operation according to example embodiments of the present invention.

One example embodiment of the present invention may include a method of processing a user initiated request for information. The method may include receiving a user initiated request including a uniform resource locator (URL) submitted to a web browser application, at operation 402. The method may also include receiving a response that the URL is an invalid URL that cannot be resolved to a corresponding webpage, at operation 404 and blocking a subsequent attempt to transmit the user initiated request as a browser modified search request that includes modifications to the user initiated request, at operation 406.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   receiving a user initiated request including a uniform resource locator (URL) submitted to a web browser application;
   receiving a response that the URL is an invalid URL;
   filtering the user initiated request to identify whether a hypertext transfer protocol (HTTP) request exists and includes a REFERER message; and
   if the REFERER message is not included in the HTTP request, then blocking a subsequent attempt to transmit the user initiated request as a browser modified search request to avoid a redirect of the user initiated request.

2. The method of claim 1, wherein the user initiated request is received as user input to an address bar portion of the web browser application.

3. The method of claim 1, wherein receiving the response that the URL is an invalid URL comprises that the URL is an invalid URL that cannot be resolved to a corresponding webpage.

4. The method of claim 3, wherein receiving a response that the URL is an invalid URL that cannot be resolved to a corresponding webpage comprises receiving a NXDOMAIN HTTP parameter.

5. The method of claim 1, wherein the browser modified search request includes modifications to the user initiated request.

6. The method of claim 1, wherein the browser modified search request comprises at least part of the user initiated request.

7. The method of claim 1, wherein the user initiated request is received as user input to a search box portion of a search-enabled web page.

8. An apparatus, comprising:
   a receiver configured to receive a user initiated request including a uniform resource locator (URL) submitted to a web browser application and receive a response that the URL is an invalid URL; and
   a processor configured to filter the user initiated request to identify whether a hypertext transfer protocol (HTTP) request exists and includes a REFERER message, and if the REFERER message is not present in the HTTP request, then block a subsequent attempt to transmit the user initiated request as a browser modified search request to avoid a redirect of the user initiated request.

9. The apparatus of claim 8, wherein the user initiated request is received as user input to an address bar portion of the web browser application.

10. The apparatus of claim 8, wherein the receipt of the response that the URL is an invalid URL comprises that the URL is an invalid URL that cannot be resolved to a corresponding webpage.

11. The apparatus of claim 10, wherein the received message that the URL is an invalid URL that cannot be resolved to a corresponding webpage comprises a NXDOMAIN HTTP parameter.

12. The apparatus of claim 8, wherein the browser modified search request includes modifications to the user initiated request.

13. The apparatus of claim 8, wherein the browser modified search request comprises at least part of the user initiated request.

14. The apparatus of claim 8, wherein the user initiated request is received as user input to a search box portion of a search-enabled web page.

15. A non-transitory computer readable storage medium comprising instructions that when executed causes a processor to perform:
   receiving a user initiated request including a uniform resource locator (URL) submitted to a web browser application;
   receiving a response that the URL is an invalid URL;
   filtering the user initiated request to identify whether a hypertext transfer protocol (HTTP) request exists and includes a REFERER message; and
   if the REFERER message is not included in the HTTP request, then blocking a subsequent attempt to transmit the user initiated request as a browser modified search request to avoid a redirect of the user initiated request.

16. The non-transitory computer readable storage medium of claim 15, wherein the user initiated request is received as user input to an address bar portion of the web browser application.

17. The non-transitory computer readable storage medium of claim 15, wherein receiving the response that the URL is an invalid URL comprises that the URL is an invalid URL that cannot be resolved to a corresponding webpage.

18. The non-transitory computer readable storage medium of claim 17, wherein receiving a response that the URL is an invalid URL that cannot be resolved to a corresponding webpage comprises receiving a NXDOMAIN HTTP parameter.

19. The non-transitory computer readable storage medium of claim 15, wherein the browser modified search request includes modifications to the user initiated request.

20. The non-transitory computer readable storage medium of claim 15, wherein the browser modified search request comprises at least part of the user initiated request.

* * * * *